Nov. 21, 1933.  A. C. CASTLE  1,936,348
WELDING ELECTRODE
Filed June 6, 1931
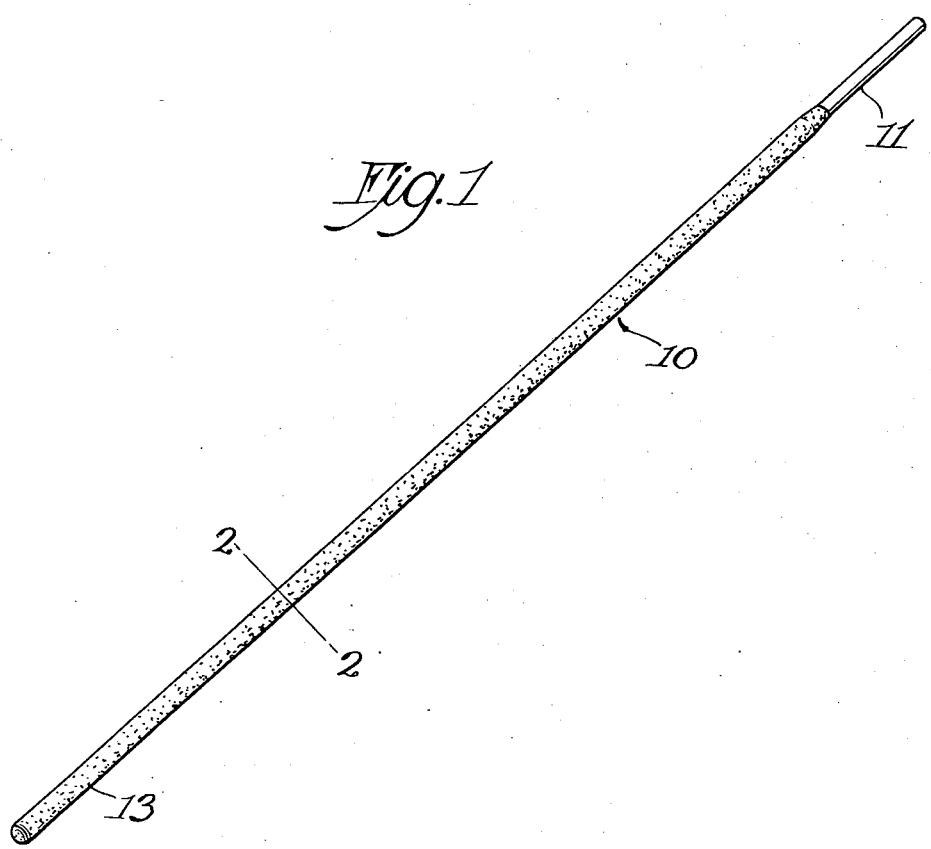
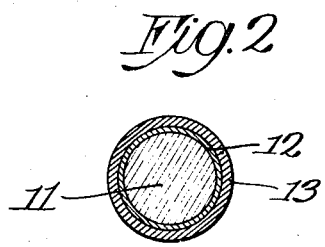
Inventor:
Alfred C. Castle
By Gibson, Mann & Cox
Attys.

Patented Nov. 21, 1933

1,936,348

UNITED STATES PATENT OFFICE 1,936,348

WELDING ELECTRODE

Alfred C. Castle, Lake Forest, Ill., assignor to A. M. Castle & Co., a corporation of Illinois Application June 6, 1931. Serial No. 542,479

4 Claims. (Cl. 219—8)

This invention relates to the welding art and more particularly to electrodes for use in arc welding.

The principal object of the invention is the provision of an electrode having new and improved means for coating the same whereby maximum speed may be attained in the welding operation.

Another object of the invention is the provision of new and improved coatings for welding rods or electrodes whereby the slag formed during the welding operation may be readily removed from the weld.

A further object of the invention is the provision of a new and improved coating for a welding electrode that will burn evenly and with sufficient rapidity to insure the proper speed in the welding operation.

A still further object of the invention is the provision of a new and improved welding rod or welding electrode the composition of the coating of which is such that in the welding operation undercutting of the weld is prevented.

A further object of the invention is the provision of a welding electrode having a coating or coatings of such composition that a crater will be formed thereby and maintained about the fused end portion of the rod.

Another object of the invention is the provision of a new and improved welding electrode member that may be manufactured at a low cost, that is quiet and efficient in operation and that is capable of maximum speed in the welding operation.

Other and further objects and advantages of the invention will appear from the following description taken in connection with the accompanying drawing, in which Fig. 1 is a perspective view of the electrode; and
Fig. 2 is a section on line 2—2 of Fig. 1.

In the use of welding electrodes or rods, it is desirable that the maximum speed be attained; that the coating or coatings fuse or burn evenly; that a crater be maintained about the fused end of the rod; that the slag formed be easily removed; that the weld be of the proper composition; and that there be no undercutting of the metal during the welding operation. The present invention seeks to accomplish all of these desirable results and more, as will appear from the following disclosure.

The rod for the welding electrode may be of the usual or any well known construction, and since the composition of the rod proper constitutes no part of the present invention it is not thought necessary to specifically describe the composition thereof further than to state that it is of ferrous material and usually has a carbon content below 2% and contains manganese to an amount less than 1%. It is usually a steel rod and its composition may vary considerably. This rod is preferably coated with an inner and an outer coat of slag forming and vapor forming materials for preventing oxidation of the molten welding metal during the welding operation.

Referring now to the drawing, the reference character 10 designates generally the electrode which comprises a rod 11 of ferrous material such as steel which is enclosed in an inner coating 12 and an outer coating 13.

In the embodiment of the invention which is selected for illustrative purposes only, the rod is preferably coated with two coats of slag and gas forming materials. The inner coat 12 acts as a medium for attaching the second coat 13 to the rod, as will presently appear. The inner coat 12 is formed of silica and carbon and a suitable binder such as the composition known in the trade as ferrotite. Water glass or sodium silicate may be used as a binder, but ferrotite is preferred because it gives superior results. For the second coat a mixture of silica, alumina, calcium carbonate, ferro-manganese, iron oxide, carbon, manganese dioxide, magnesium metal, soda ash or sodium carbonate, and aluminum reduced to a finely divided state, together with a suitable binder such as ferrotite, is employed. Here again sodium silicate or water glass may be used as a binder with satisfactory results although ferrotite is to be preferred because of its superior results.

The following proportions and ingredients give excellent results:

First coat

| | Ounces |
|---|---|
| Silica | 32 |
| Lamp black | 1 |

Mix the above with 10 liquid oz. ferrotite and 3¼ liquid oz. water.

Second coat

| | Ounces |
|---|---|
| Silica | 9 |
| Alumina | 3 |
| Calcium carbonate | 9 |
| Ferromanganese | 3 |
| Iron oxide | 16½ |
| Charcoal | 6¾ |
| Manganese dioxide | 18 |
| Magnesium metal | ⅜ |
| Soda ash (sodium carbonate) | 2¼ |
| Aluminum powder | ⅜ |

Mix the above with 39 liquid oz. ferrotite.

If it is desired to use water glass (sodium silicate) as a binder, the following has been found to give satisfactory results:

First coat

| | Ounces |
|---|---|
| Silica | 56¼ |
| Carbon (lamp black) | 2 |

Mix the above with 66 oz. total of 3 parts water, 1 part sodium silicate.

*Second coat*

| | Ounces |
|---|---|
| Silica | 18 |
| Alumina | 6 |
| Calcium carbonate | 3 |
| Ferromanganese | 6 |
| Iron oxide | 33 |
| Carbon (charcoal) | 13½ |
| Manganese dioxide | 36 |
| Magnesium metal | ¾ |
| Soda ash (sodium carbonate) | 4½ |
| Aluminum powder | ¾ |

Mix the above with 27 oz. total of 3 parts water to 1 part sodium silicate.

The coats may be applied to the rod in any suitable manner, either by dipping the rods in the composition or by extruding the composition on the rods. It has been found that excellent results are obtained by dipping the rods in the first mixture and after they have dried dipping them in the second mixture and removing them from the second mixture comparatively slowly.

By the use of an inner coat which is comparatively thin, the outer coat will adhere to the inner in quantities that will form a coat of sufficient thickness to function properly during the welding operation.

The material of the outer coating will adhere more firmly and satisfactorily to an inner coating than it will directly to the rod. Furthermore, by the use of an inner coating, uniform thickness of the second coat can be obtained throughout the length of the rod by the dipping process, whereas without its use, the thickness of the material of the second coat, if applied directly to the rod by the dipping process varies considerably throughout the length of the rod.

Certain of the materials in the two coats may be omitted, as for instance the ferro manganese or the magnesium, although their omission will result in a less desirable weld, the operation being more noisy and accompanied with more agitation of the molten material than when these materials are included in the mixture. Other elements may also be omitted, or their proportions changed. It was found, however, that with the omission of sodium carbonate or soda ash, both the operation and the resulting weld were very unsatisfactory. The welding operation was attended with arc sputtering, heavy bubbles and high sparks. The speed was very poor and there was poor penetration of the parent metal.

A common defect of the welding electrodes as heretofore constructed has been that there is an objectionable "undercutting" of the weld, that is, the parent metal is grooved at each side of the weld during the welding operation. This objectionable feature is completely eliminated by the present construction of the electrode.

In the use of the electrode, it is held at a suitable angle to the metals to be welded, and separated about $\frac{1}{16}$" therefrom.

It is thought from the foregoing taken in connection with the accompanying drawing that the construction and operation of my device will be apparent to those skilled in the art, and that various changes in size, shape, proportion and details of construction may be made without departing from the spirit and scope of the appended claims.

I claim as my invention:

1. A welding electrode comprising a metallic rod composed principally of ferrous material, an inner coating consisting of silica as the principal ingredient, carbon and a binder and an outer coating of pulverized material including gas-forming compounds comprising finely divided carbon manganese dioxide, soda ash and calcium carbonate.

2. A welding electrode comprising a metallic rod composed principally of ferrous material with not over 1% of manganese, an inner coating of silica, carbon and ferrotite as a binder, the silica constituting not less than 50% of the mass of said inner coating, and an outer coating comprising carbon, silica, magnesium and sodium carbonate in a finely divided state, and ferrotite as a binder.

3. A welding electrode comprising a metallic rod composed principally of ferrous material, an inner coating comprising a mixture of the following materials:

| | Ounces |
|---|---|
| Silica | 32 |
| Lamp black | 1 | the above mixed with 10 liquid oz. ferrotite and 3¼ liquid oz. water, and an outer coat comprising a mixture of the following materials:

| | Ounces |
|---|---|
| Silica | 9 |
| Alumina | 3 |
| Calcium carbonate | 9 |
| Ferromanganese | 3 |
| Iron oxide | 16½ |
| Charcoal | 6¾ |
| Manganese dioxide | 18 |
| Magnesium metal | ⅜ |
| Soda ash (sodium carbonate) | 2¼ |
| Aluminum powder | ⅜ | the above mixed with 39 liquid oz. ferrotite.

4. A welding electrode comprising a metal rod, said rod being coated with two coats of material, each coat comprising silica, carbon and a binder, with silica constituting a major portion of the first coat and a minor portion of the second coat, the second coat containing in addition to the elements of the first coat calcium carbonate and manganese dioxide in the ratio of 1 to 2.

ALFRED C. CASTLE.

CERTIFICATE OF CORRECTION.

Patent No. 1,936,348. November 21, 1933.

ALFRED C. CASTLE.

It is hereby certified that error appears in the printed specification of the above numbered patent requiring correction as follows: Page 2, line 98, claim 2, for "coacting" read coating; and that the said Letters Patent should be read with this correction therein that the same may conform to the record of the case in the Patent Office.

Signed and sealed this 19th day of December, A. D. 1933.

Richard Spencer (Seal)

Acting Commissioner of Patents.